(12) United States Patent
Choi (10) Patent No.: US 9,242,619 B2
(45) Date of Patent: Jan. 26, 2016

(54) METHOD FOR CONTROLLING A VEHICLE USING DRIVER AUTHENTICATION, VEHICLE TERMINAL, BIOMETRIC IDENTITY CARD, BIOMETRIC IDENTIFICATION SYSTEM, AND METHOD FOR PROVIDING A VEHICLE OCCUPANT PROTECTION AND TRACKING FUNCTION USING THE BIOMETRIC IDENTIFICATION CARD AND THE TERMINAL

(76) Inventor: Unho Choi, Seoul (KR)

( * ) Notice: Subject to any disclaimer, the term of this patent is extended or adjusted under 35 U.S.C. 154(b) by 45 days.

(21) Appl. No.: 13/440,445

(22) Filed: Apr. 5, 2012

(65) Prior Publication Data
US 2012/0253607 A1    Oct. 4, 2012

Related U.S. Application Data

(63) Continuation-in-part of application No. PCT/KR2010/006701, filed on Sep. 30, 2010.

(30) Foreign Application Priority Data

Oct. 8, 2009 (KR) .................. 10-2009-0095870
Dec. 1, 2009 (KR) .................. 10-2009-0117598

(51) Int. Cl.
*B60R 22/00*  (2006.01)
*B60R 25/25*  (2013.01)
(Continued)

(52) U.S. Cl.
CPC ............ *B60R 25/25* (2013.01); *G06K 9/00832* (2013.01); *G06Q 10/063* (2013.01)

(58) Field of Classification Search
CPC .......................... B60R 25/25; G06K 9/00832
USPC .................... 701/49; 340/5.82, 5.83
See application file for complete search history.

(56) References Cited

U.S. PATENT DOCUMENTS 5,973,619 A * 10/1999 Paredes .................. 340/994
6,101,477 A *  8/2000 Hohle et al. .............. 705/5
(Continued)

FOREIGN PATENT DOCUMENTS

KR    2004063245 A  *  7/2004
KR    1020040063245      7/2004
(Continued)

OTHER PUBLICATIONS

Makarov et al., Authenticating Vehicles and Drivers in Motion Based on Computer Vision and RFID tags, pp. 419-424, SISY 2012 • 2012 IEEE 10th Jubilee International Symposium on Intelligent Systems and Informatics • Sep. 20-22, 2012, Subotica, Serbia.*
(Continued)

*Primary Examiner* — Behrang Badii
*Assistant Examiner* — Daniel L Greene
(74) *Attorney, Agent, or Firm* — Grossman Tucker Perreault & Pfleger, PLLC (57) ABSTRACT

Embodiments relate to a method for controlling a vehicle using driver authorization, to an on-vehicle terminal, to a biometric identity card, to a biometric identification system, and to a method for providing a vehicle occupant protection function using the biometric identification card and the terminal. According to one embodiment, a vehicle occupant protection and tracking function is provided such that a smart key function is provided to perform driver authorization and vehicle control operation using a biometric identity card, a chauffeur service provision status is informed through communications between a terminal such as a mobile phone and the biometric identity card, and the vehicle is tracked upon receiving the information on the chauffeur service provision status. According to one embodiment, driver authorization and the vehicle control operation are controlled using a biometric identity card to prevent the vehicle theft, and the chauffeur service provision status is indicated to enable chauffeur identification and vehicle tracking.

26 Claims, 5 Drawing Sheets

(51) Int. Cl.
*G06Q 10/06* (2012.01)
*G06K 9/00* (2006.01)

(56) References Cited

U.S. PATENT DOCUMENTS

| | | | | |
|---|---|---|---|---|
| 6,490,443 | B1* | 12/2002 | Freeny, Jr. | 455/406 |
| 6,847,892 | B2* | 1/2005 | Zhou et al. | 701/408 |
| 6,898,299 | B1* | 5/2005 | Brooks | 382/115 |
| 7,047,888 | B2* | 5/2006 | Richards | 104/28 |
| 2002/0100803 | A1* | 8/2002 | Sehr | 235/384 |
| 2003/0220876 | A1* | 11/2003 | Burger et al. | 705/50 |
| 2004/0260470 | A1* | 12/2004 | Rast | 701/300 |
| 2006/0213986 | A1* | 9/2006 | Register et al. | 235/382.5 |
| 2007/0198432 | A1* | 8/2007 | Pitroda | G06Q 20/02 705/64 |
| 2007/0252001 | A1* | 11/2007 | Kail et al. | 235/380 |
| 2009/0085725 | A1* | 4/2009 | Brookner et al. | 340/10.41 |
| 2010/0250290 | A1* | 9/2010 | Lefkowitz et al. | 705/5 |

FOREIGN PATENT DOCUMENTS

| | | |
|---|---|---|
| KR | 1020050090585 | 9/2005 |
| KR | 1020060115557 | 11/2006 |
| KR | 100739459 | 7/2007 |

OTHER PUBLICATIONS

PCT International Search report dated Jun. 14, 2011 received in corresponding PCT Application No. PCT/KR10/06701, 4 pgs.

* cited by examiner

Vehicle Control System (10)

METHOD FOR CONTROLLING A VEHICLE USING DRIVER AUTHENTICATION, VEHICLE TERMINAL, BIOMETRIC IDENTITY CARD, BIOMETRIC IDENTIFICATION SYSTEM, AND METHOD FOR PROVIDING A VEHICLE OCCUPANT PROTECTION AND TRACKING FUNCTION USING THE BIOMETRIC IDENTIFICATION CARD AND THE TERMINAL

CROSS-REFERENCE TO RELATED APPLICATIONS

This application is a continuation of PCT/KR2010/006701 filed Sep. 30, 2010, which claims priority to Korean Patent Application Nos. 10-2009-0095870 filed Oct. 8, 2009 and 10-2009-0117598 filed Dec. 1, 2009, the entire contents of which are incorporated herein by reference.

TECHNICAL FIELD

The present disclosure relates to a method for controlling a vehicle using driver authorization, a vehicle terminal, a biometric identity card, and a method for providing vehicle occupants protection tracking function by using a biometric authentication card and a terminal. More particularly, the present invention relates to a method for controlling a vehicle using driver authorization, a vehicle terminal, a biometric identity card, and a method for providing vehicle occupants protection tracking function by using a biometric authentication card and a terminal, which can allow a driver having a biometric authentication card to get into a vehicle after authorizing the biometric information included in the biometric authentication card, and operate the vehicle to run after authorizing the driver authorization, for allowing the driver to operate the vehicle, through the vehicle terminal when the driver get into the vehicle completely.

BACKGROUND

The statements in this section merely provide background information related to the present disclosure and may not constitute prior art.

In the past, vehicle management companies such as taxi companies, car rental agencies, chauffeur service companies, truck driving agencies, manage the vehicle management in a manner that of assigning each driver to a corresponding driver, respectively.

However, there is the disadvantage that the vehicle management companies may be on in a defenseless state, since any person, who has a vehicle-key, can get into the vehicle and operate to drive even if the person is not assigned from the vehicle management company.

DISCLOSURE

Technical Problem

Therefore, the present disclosure has been made in view of the above mentioned problems to provide in one aspect a vehicle control system through a driver authorization, which allows an authorized driver to get into the corresponding vehicle by controlling opening or closing of a vehicle door in accordance with the biometric information result.

The present disclosure to provide in other aspect a vehicle controlling method through a driver authorization which allows the authorized driver, only authorized the driver authorization, to start up and drive the vehicle by executing the driver authorization by using the biometric authentication card and controlling the permit limited operation in accordance with the driver authorization result.

The present disclosure to provide in another aspect a method for providing vehicle occupants protection tracking function by using a biometric authentication card and a terminal, which authorizes the driver identity and use the protecting and tracking function for the vehicle occupants including a driver and a passenger by notifying the chauffeur service information by using the biometric authentication card and the terminal when the user use chauffeur service.

SUMMARY

An aspect of the present disclosure provides a method for providing vehicle occupant protecting and tracking function by using a biometric authentication card and a terminal, the method comprises receiving a chauffeur service status information of a vehicle through communication between the terminal and the biometric authentication card; and identifying a vehicle occupant including at least a driver identity or a passenger identity upon receiving the chauffeur service status information.

Other aspect of the present disclosure provides a vehicle control system through a driver authorization comprises a biometric authentication card for transmitting card information comprising a door opening or closing signal for controlling opening or closing of the vehicle door or a first vehicle assignment information in accordance with the biometric information authentication result; and a vehicle terminal for storing a second vehicle assignment information; controlling opening or closing of the vehicle door based on the control information received from the biometric authentication card; executing a driver authorization driver authorization in accordance with a comparison result between the first and the second vehicle assignment information; and controlling a permit limited operation according to the authorization result; wherein the first vehicle assignment information comprises a user information of the biometric authentication card and a registered vehicle information, and the second vehicle assignment information comprises a registered driver information.

The other aspect of the present disclosure provides a vehicle controlling method through a driver authorization, the method comprise receiving card information including a door opening or closing signal for controlling opening or closing of the vehicle and a first vehicle assignment information provided from a biometric authentication card; controlling opening or closing of a corresponding vehicle door based on a door opening or closing signal and executing a driver authorization process by comparing the first vehicle assignment information with a second vehicle assignment information stored; and controlling a permit limited operation in accordance with the authorization result; wherein the first vehicle assignment information comprises a user information of the biometric authentication card and a registered vehicle information, and the second vehicle assignment information comprises a registered driver information.

Advantageous Effects

According to the present disclosure as described above, the authorized driver, authorized the driver authorization, can start up or drive the vehicle by controlling the permit limited operation in accordance with the driver authorization result, since the vehicle terminal executes the driver authorization by using the biometric authentication card that the driver possesses, thereby preventing the vehicle stolen beforehand.

According to the preferred embodiment of the present invention, it can obtain the effect that the vehicle theft is no longer be progressed by controlling disallow the vehicle to run, when the corresponding vehicle has moved exceeding the predetermined distance after the driver authorization failure. It can obtained the effect that the vehicle stolen can be prohibited beforehand, and promptly inform the vehicle stolen information by transmitting an auto vehicle theft alarm message, in case that the driver authorization is unsuccessful or the corresponding vehicle has moved exceeding the predetermined distance after failing the driver authorization.

According to the preferred embodiment of the present invention, it can obtain the effect that the driver identity can authorize and use the protecting and tracking function for the vehicle occupant including the driver and the passenger, since the driver identity can be authorized and the vehicle also can be tracked by notifying the chauffeur service information when the person use the chauffeur service.

DETAILED DESCRIPTION

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 1:
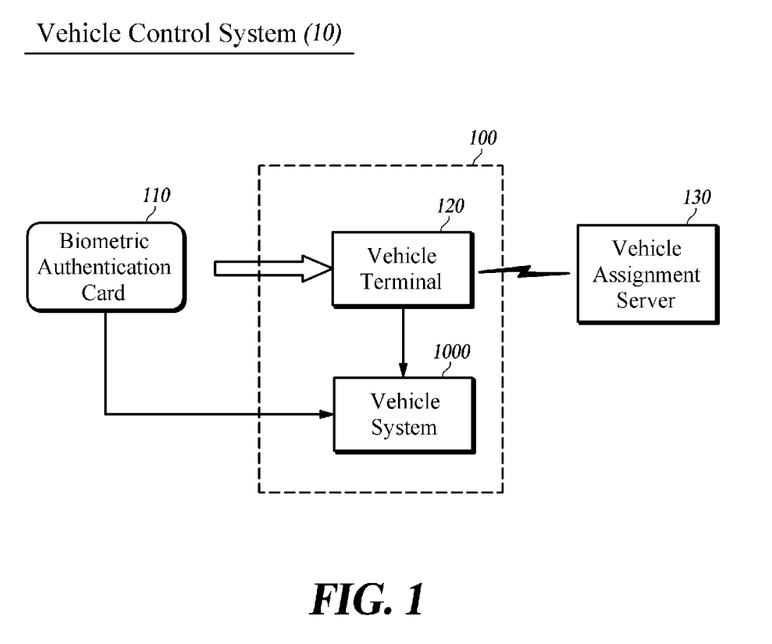
FIG. 1 is a block diagram schematically showing a vehicle control system through a driver authorization according to a preferred embodiment of the present invention.

FIG. 1 is a block diagram schematically showing a vehicle control system through a driver authorization in accordance with a preferred embodiment of the present invention.

Referring to FIG. 1, the vehicle control system through the driver authorization according to the preferred embodiment comprises a biometric authentication card 110, a vehicle terminal 120 and a vehicle assignment server 130.

The biometric authentication card 110 transmits card information comprising a door opening or closing signal for controlling opening or closing of the vehicle door and a first vehicle assignment information in accordance with the biometric information authentication result. The first vehicle assignment information preferably comprises a user information having at least one of information that are used in a national traffic information system such as name, sex, resident registration number, address, vehicle ownership, and a vehicle information including at least one of the registration vehicle number that are available for the user, a kind of vehicle, model year of vehicle, vehicle history, car running records, car mortgage/seize information, vehicle lost/stolen, and carbon emissions management (ECO) functionality. The biometric authentication card 110 can connect to the vehicle assignment server 130 through a wireless or wired network, register a user and a vehicle corresponding to the user in the vehicle assignment server 130, and receive the encrypted first vehicle assignment information from the vehicle assignment server 130 in response to the registration of the user and the vehicle. The reception of the first vehicle assignment information is performed as of the issue of the biometric authentication card 110, and the first vehicle assignment information is preferably changeable, if necessary.

The vehicle terminal 120 stores a second vehicle assignment information and controls opening and closing of the vehicle door in accordance with the door opening or closing signal received from the biometric authentication card 110. The vehicle terminal 120 receives the first vehicle assignment information from the biometric authentication card 110 and compares it with the second vehicle assignment information, and executes a driver authorization in accordance with the comparison result and thereby controls the permit limited operation in accordance with the authorization result. The second vehicle assignment information preferably comprises at least one of the vehicle information for a corresponding vehicle and the user information having at least one of a driver name registered in an authorized driver for the corresponding vehicle, sex, resident registration number, address, vehicle ownership, other information that are used in the national traffic information system. The vehicle terminal 120 can connect to the vehicle assignment server 130 through the wireless or wired network, register the corresponding vehicle and the driver of corresponding vehicle in the vehicle assignment server 130, and receive the encrypted second vehicle assignment information from the vehicle assignment server 130 in response to the registration of both the vehicle and the driver.

The biometric authentication card 110, as described above, comprises a biometric information authentication unit for authenticating the biometric information, and stores the biometric information for a card user (the authorized driver) of the biometric authentication 110.

When a driver attempts to open the vehicle door to get into the vehicle 100 by using the biometric authentication card 110, the driver inputs his or her biometric information to the biometric information authentication device installed in the biometric authentication card 110. Accordingly, the biometric authentication card 110 compares the biometric information input in the biometric information authentication device with the biometric information previously stored, and controls to open the vehicle door, if it is determined that the certain driver attempted to open the vehicle door matches the authorized driver previously registered. On the other hand, the biometric authentication card 110 controls to maintain the closed status of the vehicle door equipped in the vehicle system, if it is determined that input biometric information fails to match the biometric information. Thus, an attempt of the vehicle theft can be prohibited beforehand, since only the authorized driver can get into the vehicle 100.

The biometric authentication card 110 may store the biometric information selected from at least one of fingerprint pattern recognition information, vascular pattern recognition information, voice pattern recognition information, iris pattern recognition information, and palm pattern recognition information.

In case that the vehicle door gets open by using the biometric authentication card 110, a person determined as an authorized driver, can get into the vehicle 100, and the person can operate the vehicle to run. The vehicle operation can be achieved only when the driver authorization is successful through a driver authorization process using the vehicle terminal 120.

The driver authorization process for the vehicle operation will be now described in detail. If a certain user, who successfully gets into the vehicle 100 in accordance with the authorization result, contacts or approaches the biometric authentication card 110 near the vehicle terminal 120 such as a navigator or a taximeter equipped near a dash board of the vehicle in order to authorize himself/herself, the vehicle terminal 120 receives the card information stored in the biometric authentication card 110 and compares the first vehicle assignment information included in the received card information with the second vehicle assignment information stored in the vehicle terminal 120 and thereby executes the driver authorization process.

The biometric authentication card 110 receives and stores the first vehicle assignment information including the driver information and the assigned vehicle information from the vehicle assignment server 130, if the biometric authentication card 110 approaches the vehicle terminal 120, the biometric authentication card 110 transmits the card information including the first vehicle assignment information to the vehicle terminal 120. The card information can be transmitted by using RFID (Radio-Frequency IDentification: RFID) method or IC card interface, etc. That is, after controlling to open the vehicle door upon the biometric matching result by using the biometric authentication card 110, if the biometric authentication card 110 gets close to the vehicle terminal 120 within a predetermined distance, a RFID reader of the vehicle terminal 120 may read the card information stored in the biometric authentication card 110 through the RFID method.

The vehicle terminal 120 having received the card information from the biometric authentication card 110 compares the first vehicle assignment information (including the user information and the assigned vehicle information) included in the received card information with the second vehicle assignment information (including the vehicle information and the registered driver information) previously stored from the vehicle assignment server 130. If the two information match each other, it is determined that the driver authorization is successful, while unless the two vehicle assignment information matches, the driver authorization is regarded as failure. Thus, in case that the corresponding vehicle is assigned in the first assignment information and the user of the biometric authentication card 110 is registered in the second assignment information as a driver, it is regarded that the driver authorization is successful.

Next, the vehicle terminal 120 outputs an authorization success message on a screen or an authentication success sound through a speaker when the driver authorization is successful and controls the vehicle system 1000 to enable the vehicle operation. Accordingly, the authorized driver assigned to the vehicle 100 can drive the corresponding vehicle 100.

On the other hand, the vehicle terminal 120 outputs an authorization failure message on the screen or an authorization failure sound through the speaker when the driver authorization is unsuccessful, and controls the vehicle system 1000 not to allow the vehicle operation. Accordingly, an attempt of the vehicle theft can be prevented.

The vehicle terminal 120 can control the vehicle system 1000 to disallow the vehicle to travel a distance exceeding a predetermined distance once the driver authorization is determined unsuccessful. In this way, theft attempt is no longer be progressed, since the first attempt of the vehicle theft.

The vehicle terminal 120 can transmit an auto vehicle theft alarm message to the vehicle assignment server 130 or a terminal of a vehicle manager when the driver authorization is failed or the corresponding vehicle 100 has moved exceeding the predetermined distance (which is an amount such that it can be determined as the vehicle theft has happened) upon driver authorization failure. Accordingly, the attempt of the vehicle theft can be prohibited beforehand, or the vehicle theft can be promptly alarmed.

The vehicle terminal 120 can transmit certain information for tracking a real-time location for the corresponding vehicle 100, while the corresponding vehicle travels after the successful authorization. Therefore, a vehicle management can be easily and correctly done.

In case that the vehicle terminal 120 is employed in a business vehicle such as taxi or bus etc., it can execute a transportation fare payment module after the driver authorization is successfully completed. Accordingly, only the driver assigned to the corresponding vehicle 100 can charge the fare to a passenger.

The vehicle system 1000 in FIG. 1 represents a vehicle control-related system included in the vehicle 100 such as taxi, renter car, chauffeur service vehicle, bus, or truck etc., and may comprise a vehicle door for controlling opening or closing thereof in accordance with the biometric information authentication result in the biometric authentication card 110, an electronic control unit (ECU) for controlling the vehicle operation in accordance with the driver authorization result in the vehicle terminal 120, and a start engine, etc.

Figure 2:
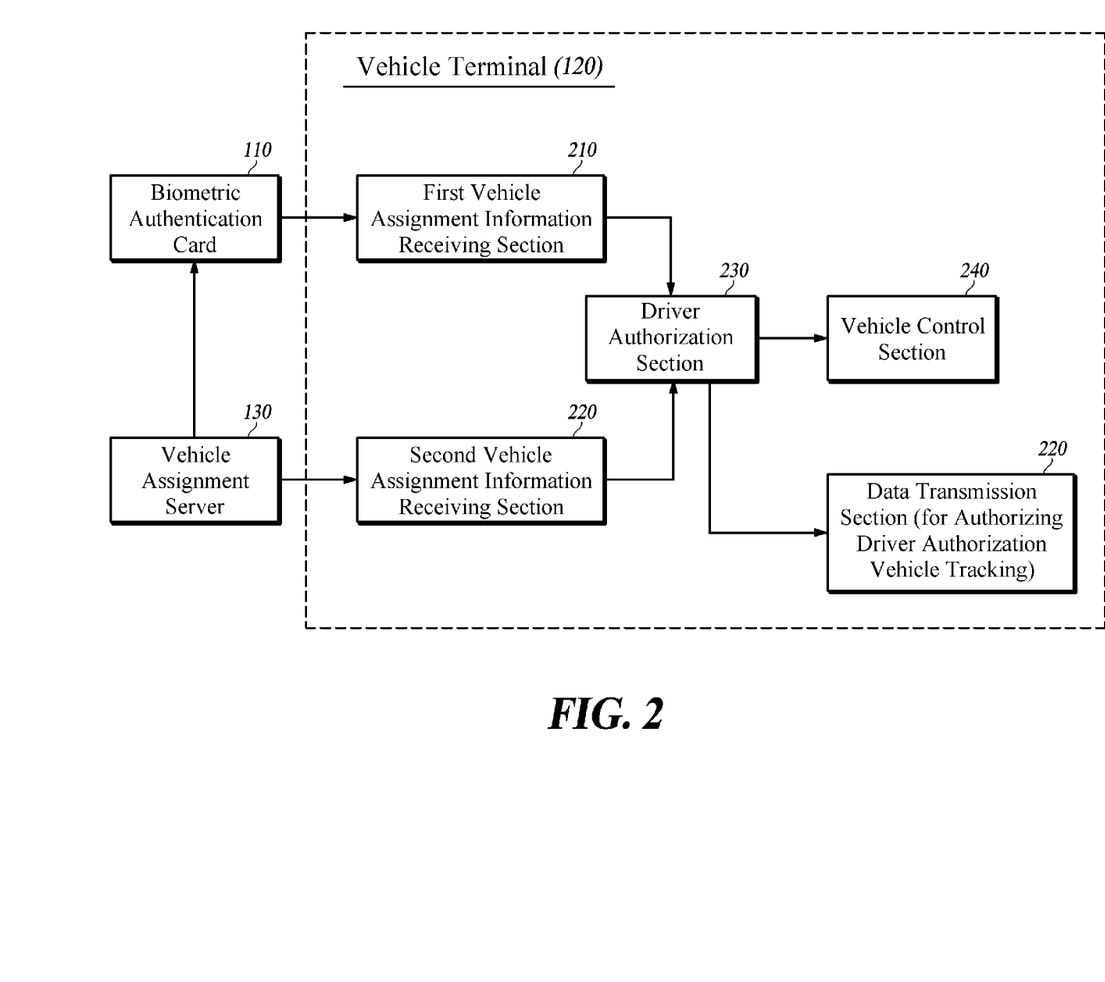
FIG. 2 is a block diagram schematically showing a vehicle terminal for serving the vehicle control function though a driver authorization according to a preferred embodiment of the present invention.

As shown in FIG. 2, to perform the vehicle control functions as described above, the vehicle terminal 120 according to a preferred embodiment of the present invention, comprises a first vehicle assignment information receiving section 210 for receiving a card information including a door opening or closing signal for controlling opening or closing of the corresponding vehicle door from the biometric authentication card 110, and the first vehicle assignment information (including a user information and an assigned vehicle information); a second vehicle assignment information receiving section 220 for receiving the second vehicle assignment information (including a driver information assigned to the corresponding vehicle 100 and a vehicle information for the corresponding vehicle 100) from the vehicle assignment sever 130; a driver authorization section 230 for executing the driver authorization process in accordance with the result of comparison between the first vehicle assignment information received from the biometric authentication card 110 and the second vehicle assignment information received from vehicle assignment server 130; a vehicle control section 240 for controlling the permit limited operation in accordance with the driver authorization result; and a data transmission section 250 for generating and transmitting location tracking data for the corresponding vehicle in real time, in case the driver authorization is successful and the corresponding vehicle is driven subsequently.

The first vehicle assignment information receiving section 210 can receive the card information including the first vehicle assignment information from the biometric authentication card 110 through one of the RFID reader, the IC card interface or the like.

The second vehicle assignment information receiving section 220 receives the second vehicle assignment information from the vehicle assignment server 130 through the wireless or wired communication network, and stores the received second vehicle assignment information in a storage medium. If a driver assigned to the corresponding vehicle is changed, the second vehicle assignment information receiving section 220 can update the second vehicle assignment information stored in the storage medium upon receiving a new second vehicle assignment information.

The driver authorization section 230 compares the first vehicle assignment information received from the biometric authentication card 110 with the second vehicle assignment information previously stored, and authorizes a user of the corresponding the biometric authentication card 110 as an authorized driver.

The vehicle control section 240 can control opening or closing of the vehicle door based on the door opening or closing signal received from the biometric authentication card 110. The first authorization information for authorizing the authorized user is preferably included in the door opening or closing signal received from the biometric authentication card 110, which will be further explained.

After the driver authorization section 230 executes the driver authorization process, the vehicle control section 240 can control the permit limited operation by controlling the vehicle system 1000 in accordance with the authorization result. In relation with the description as above, the vehicle control section 240 can execute the various control functions which will be described below.

The vehicle control section 240 outputs the authorization success message on the screen or the authorization success sound through the speaker when the driver authorization is successfully completed, and controls the vehicle system 1000 to enable the vehicle operation.

The vehicle control section 240 outputs an authorization failure message on the screen or an authorization failure sound through the speaker when the driver authorization results in a failure and controls the vehicle system 1000 to deactivate the vehicle operation.

The vehicle control section 240 can control the vehicle system 1000 so that the corresponding vehicle 100 is forced to stop after traveling the predetermined distance in case the driver authorization ends up failure.

The vehicle control section 240 can transmit the auto vehicle theft alarm message to the vehicle assignment server 130 or a terminal of a vehicle manager, when the driver authorization ends up failure or the corresponding vehicle 100 has driven exceeding the predetermined distance (which is an amount such that it can be determined as the vehicle theft has happened).

The vehicle control section 240 can transmit information for tracking in real-time location of the corresponding vehicle 100, when the corresponding vehicle 100 is driven after the authentication is successful.

If the vehicle terminal 120 is a business vehicle such as taxi or bus etc., the vehicle control section 240 can execute the transportation fares payment module once the authentication is successful.

Meanwhile, as shown in FIG. 2, the vehicle terminal 120, for providing various vehicle control functions through the driver authorization, further comprises a data transmission section 250 for generating and transmitting a driver identification data and a vehicle tracking data such as vehicle location information to a vehicle tracking system based on the driver authorization execution result in the driver authorization section 230 so as to protect at least a passenger including a driver and a passenger.

Figure 3:
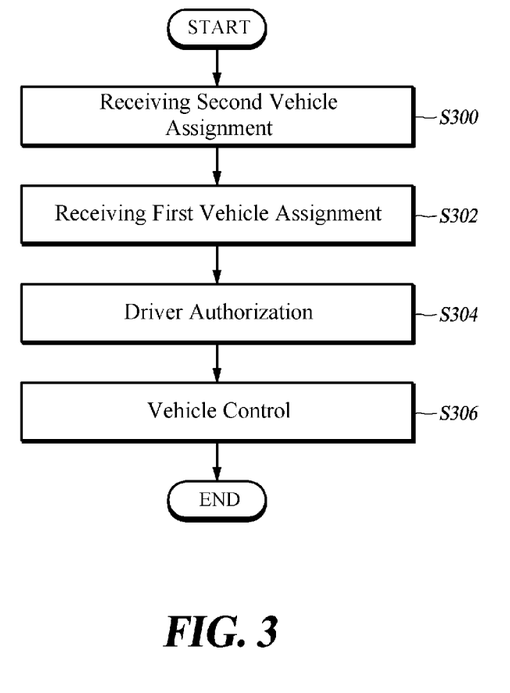
FIG. 3 is a flow chart of a vehicle control method through a driver authorization provided from the vehicle terminal according to a preferred embodiment of the present invention.

FIG. 3 is a flow chart of a vehicle control method through a driver authorization provided from the vehicle terminal 120 according to a preferred embodiment of the present invention.

Referring to FIG. 3, the vehicle controlling method through the driver authorization comprises a second vehicle assignment information receiving step S300 of receiving a second vehicle assignment information from the vehicle assignment server 130; a first vehicle assignment information receiving step S302 of receiving a first vehicle assignment information from the biometric authentication card 110; a driver authorization step S304 of executing the driver authorization in accordance with the comparison result between the first vehicle assignment information received from the biometric authentication card 110 and the second vehicle assignment information received from the vehicle assignment server 130; and a vehicle control step S306 of controlling the permit limited operation in accordance with the authorization result.

Figure 4:
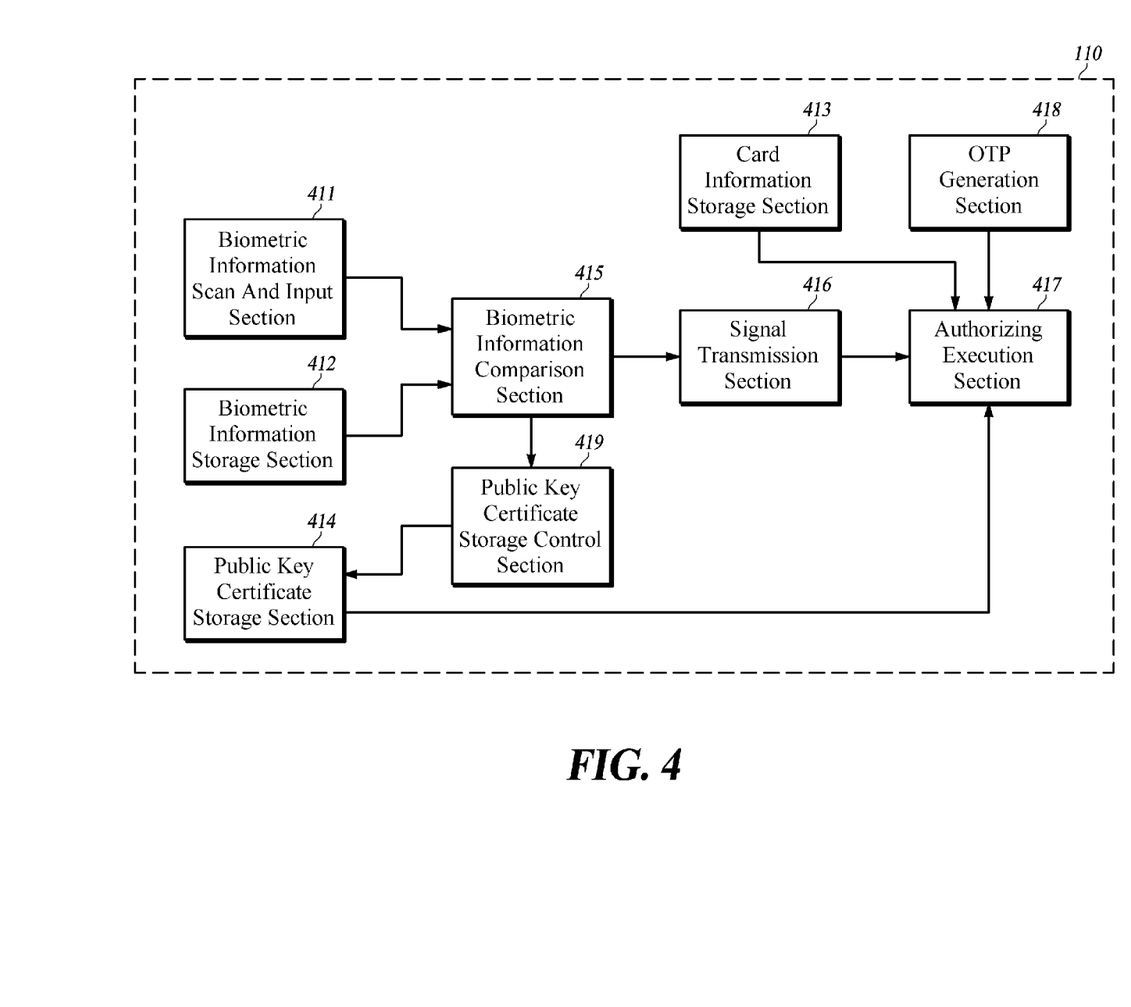
FIG. 4 is a block diagram schematically showing the biometric authentication card according to a preferred embodiment of the present invention.

FIG. 4 is a block diagram schematically showing the biometric authentication card in accordance with a preferred embodiment of the present invention.

As shown in FIG. 4, the biometric authentication card 110 comprises a biometric information scan and input section 411, a biometric information storage section 412, a card information storage section 413, a public key certificate storage section 414, a biometric information comparison section 415, a signal transmission section 416, an authorizing execution section 417, an OTP generation section 418, and a public key certificate storage control section 419.

A user of the biometric authentication card 110 can input the biometric information in the biometric information scan and input section 411. Here, the biometric information scan and input section 411 can be implemented as one of a fingerprint authentication sensor, a blood vessel authentication sensor, a voice authentication sensor, an iris authentication sensor, or a palm authentication sensor, etc.

The biometric information storage section 412 stores the biometric information for a registered subscriber, that is a user of the biometric authentication card 110, by a card issue server (not shown) of the first vehicle assignment information receiving section 210. At this time, the biometric information storage section 412 stores the biometric information corresponding to a sensor type of the biometric information scan and input section 411. That is, if the biometric information scan and input section 411 is implemented as a fingerprint authentication sensor, the biometric information storage section 412 can store the fingerprint pattern recognition information as the biometric information, while if the biometric information scan and input section 411 is implemented as a iris authentication sensor, the biometric information storage section 412 stores the iris pattern recognition information as the biometric information. Here, the card issue server of the biometric authentication card 110 is a server of the official certificate authority or the private certificate authority, interlinks with the vehicle assignment server 130 serving the vehicle assignment service, stores the user biometric information of the biometric authentication card 110 in the biometric information storage section 41, registers and stores the biometric information which is matched with the user biometric information stored, and encrypts the biometric authentication card 110 not to allow amendment, deletion, addition and etc. for the biometric information stored in the biometric information storage section 412 of the biometric authentication card 110.

The biometric information storage section 412 can store a plurality of biometric information for a plurality of registered users. For example, in case that the fingerprint pattern recognition information for a registered subscriber is stored as the biometric information, the fingerprint pattern recognition information for each finger can be stored, and the iris pattern recognition information of both eyes can be stored, in case that the iris pattern recognition information for the registered subscriber is stored as the biometric information.

The biometric information storage section 413 receives and stores the registered user information and the first vehicle assignment information provided from the vehicle assignment server 130.

Meanwhile, the card issue server of the biometric authentication card 110 may issue the biometric information of the registered subscriber with the public key certificate which matches the biometric information. That is, if the user registered as a driver of a corresponding vehicle, is subscribed to a corresponding biometric card issuing authority to issue the biometric authentication card 110 and registers the driver biometric information, the card issue server of the biometric authentication card 110 encodes the registered biometric information and inserts the encoded information into a public key certificate, and issues the corresponding public key certificate to the corresponding user. The biometric information preferably includes at least one of fingerprint pattern recognition information of the registered subscriber, vascular pattern recognition information, voice pattern recognition information, iris pattern recognition information, and palm pattern recognition information.

In this case, the public key certificate storage section 414 stores the public key certificate issued by the card issue server of the biometric authentication card 110. Here, the digital issuing authority only stores the public key certificate in the public key certificate storage section 414. But in other cases, it can be implemented as the user either accesses to the card issue server of the biometric authentication card 110 through the network to download a corresponding public key certificate and stores the downloaded public key certificate in the public key certificate storage section 414, or copies the corresponding public key certificate from a personal computer and stores the copied public key certificate in the public key certificate storage section 414.

The biometric information comparison section 415 compares the biometric information inputted from the biometric information scan and input section 411 with the biometric information stored in the biometric information storage section 412 to determine whether the two biometric information are matched or not. That is, the biometric information comparison section 415 compares the user biometric information authenticated by the biometric authentication card 110 with the subscriber biometric information registered by the public key certificate card issue server.

The signal transmission section 416 transmits a tunneling start signal to establish a communication tunnel to the vehicle terminal 120 when it is determined that the biometric information inputted from the biometric information scan and input section 411 matches the biometric information stored in the biometric information storage section 412. Alternatively, the signal transmission section 416 may transmit the tunneling start signal to the vehicle assignment server 130 through the vehicle terminal 120. In case of transmitting the tunneling start signal to the vehicle assignment server 130 through the vehicle terminal 120, the location of the vehicle assignment server 130 on the network can be established by URL (Uniform Resource Locator), and the communication tunnel can also be established by setting up a VPN (Virtual Private Network) by using the established URL (Uniform Resource Locator). This tunneling start signal can be used as the door opening or closing signal as described-above, and it can also be used as the first authorization information for authorizing the authorized holder of the biometric authentication card 110.

The authorizing execution section 417 transmits the authorization process information, representing that the user of the biometric authentication card 110 is authorized as the authorized user through the biometric information, to the vehicle terminal 120 or the vehicle assignment server 130, when the communication tunnel is established to the vehicle terminal 120 or the vehicle assignment server 130 by the signal transmission section 416. At this time, the authorization process information, transmitted to the vehicle terminal 120 or the vehicle assignment server 130, may include authorized view information, unique identification information designated to the biometric authentication card 110, a user information stored in the card information storage section 413, and the first vehicle assignment information. The authorizing execution section 417 can execute the second authorization process for the user by transmitting the authorization process information with the authorizing information based on the public key certificate stored in the public key certificate storage section 414.

The authorizing execution section 417 can harden the authorization process by executing both the first authorization process based on the user biometric information and the second authorization process for the user of the biometric authentication card 110 by transmitting the authorization information based on the public key certificate, which matches the user who is authorized with the biometric information, based on the user biometric information and the public key certificate stored in the public key certificate storage section 414.

Meanwhile, in case that a plurality of biometric information, for the multiple registered subscribers, are stored in the biometric information storage section 412, the signal transmission section 416 is implemented to be transmitted the tunneling start signal to another target terminal in accordance with the biometric information which matches the biometric information inputted from the biometric information scan and input section 411. For example, in case that the finger information, for the plurality of registered subscriber fingers, are stored in the biometric information storage section 412 as the biometric information, the communication tunnel is established to a security managing server such as the National Police Agency server etc. by one of the finger information and emergency signal is transmitted. Accordingly, if the user is forced to execute the authorization process using the biometric card 110 under threat, it can be implemented to be reported through the fingerprint pattern recognition information.

The OTP generation section 418 generates a one-time password in the predetermined way set by the issuing organization of the biometric authentication card 110. The one-time password, generated by the OTP generation section 418, can be displayed to be viewed by the user of the biometric authentication card 110. The authorizing execution section 417 can be implemented to transmit the authorization information to the vehicle terminal 120 or the vehicle assignment server 130 after executing the authorization process again for the user of the biometric authentication card 110 using the one-time password inputted by the user. Also, since the one-time password generated by the OTP generation section 418 is not seen in the biometric authentication card 110, the authorizing execution section 417 combines the one-time password with the authorization information to transmit to the target terminal. Accordingly, it can also be implemented that the biometric authentication card 110 may be authenticated as a third phase that the card is issued by an authorized issuing organization, by allowing the target terminal side to check upon the user authentication based on the one-time password.

In case that the public key certificate storage control section 419 stores the public key certificate in the public key certificate storage section 414, it can be implemented that the corresponding public key certificate is stored in the public key certificate storage section 414, only when the user biometric information inputted from the biometric information scan and input section 411 matches the user biometric information stored in the biometric information storage section 412. Also, the public key certificate storage control section 419 determines whether the user biometric information inputted from the biometric information scan and input section 411 matches the user biometric information stored in the biometric information storage section 412 or not, and then determines whether the information matching to the user biometric information in the corresponding public key certificate which will be stored in case the two biometric information are matched. And, the public key certificate storage control section 419 can be implemented to be stored the public key certificate in the public key certificate storage section 414, only when the biometric information and the matching information are included in the corresponding public key certificate. Accordingly, the public key certificate storage control section 419 may allow the authorized user of the biometric authentication card 110 to store the public key certificate in the public key certificate storage section 414. Primarily, the public key certificate storage control section 419 determines whether the user of the biometric authentication card 110 is the authorized user or not, and secondly the public key certificate stored in the public key certificate storage section 414 is allowed only for the public key certificate including the information matching the authorized user biometric information.

The authorizing execution section 417 can enhance the user authorization process by transmitting the driver authorization information stored in the public key certificate storage section 414 when it is determined that the user biometric information inputted from the biometric information scan and input section 411 matches the user biometric information stored in the biometric information storage section 412 by using the biometric information comparison section 415, in case that the authorization information is requested from the vehicle terminal 120. That is, the public key certificate storage section 414 can enhance the security for using the public key certificate and increase the reliability by storing only the public key certificate for the authorized user and the public key certificate matching the user biometric information, and transmitting the authorization information by only the authorized user when the authorization information is transmitted to outside based on the public key certificate stored in the public key certificate storage section 414.

In the preferred embodiment, the biometric authentication card 110 is implemented as a smart card, but it can be also implemented as a dongle or a USB token, while the biometric authentication card 110 is not limited to a kind of the smart card.

Figure 5:
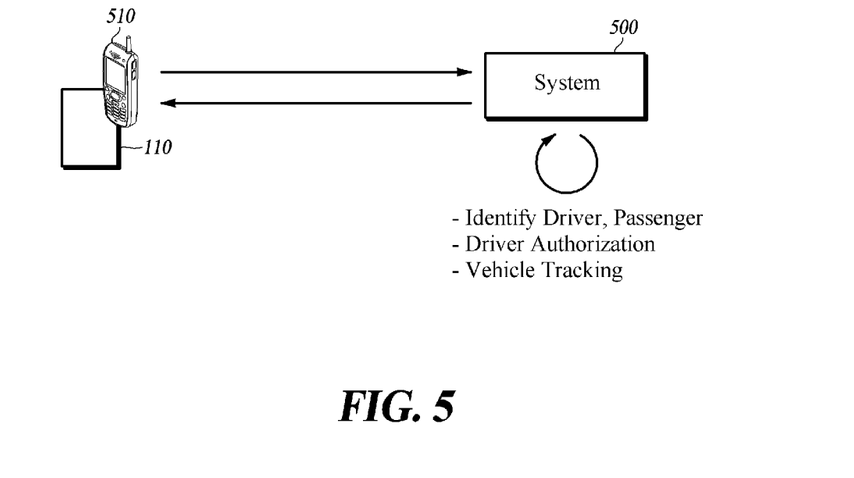
FIG. 5 is a view schematically illustrating a vehicle occupants protecting and tracking function using the biometric authentication card and a terminal according to a preferred embodiment of the present invention.

FIG. 5 is a view schematically illustrating a system 500 for serving vehicle occupants tracking method using a biometric card and a terminal, and a method for providing a vehicle occupants tracking function by the system. Referring to FIG. 5, according to the preferred embodiment, the method for providing vehicle occupants tracking using the biometric card and the terminal comprises: receiving, at the system 500, a chauffeur service status information of the vehicle through communication method such as RFID communication manner between the terminal 510 and the biometric authentication card 110; and tracking the corresponding vehicle until the finished time of the chauffeur service upon receiving the chauffeur service status information.

The method for providing occupant protecting and tracking service according to a preferred embodiment of the present invention further comprises: identifying the vehicle occupant identity, after receiving a biometric matching result from the biometric authentication card 110 in the system 500, for the vehicle occupant including at least one of the driver or the passenger through the communication between the terminal 510 and the biometric authentication card 110; executing a driver authorization based on the received biometric matching result; transmitting the authorization result to the terminal 510; and storing the biometric matching result and the driver authorization result, respectively.

The terminal comprises at least one of a mobile communication terminal such as a cellular phone etc., or a communication device equipped in the vehicle.

Meanwhile, the method for providing vehicle occupant tracking according to the preferred embodiment of the present invention further comprises at least step of controlling of opening or closing the vehicle door and the permit limited operation in accordance with the biometric matching result for a certain driver through the biometric authentication card.

Figure 6:
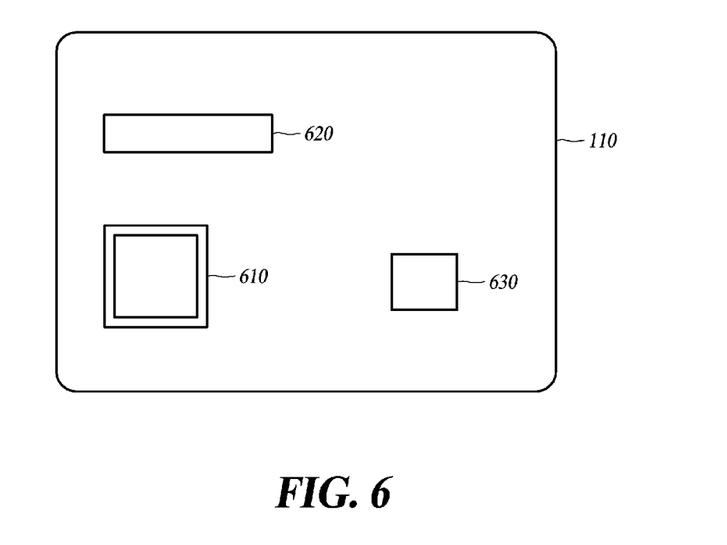
FIG. 6 is a view prefiguratively illustrating a biometric authentication card according to a preferred embodiment of the present invention.

In the preferred embodiment of the present invention, the biometric authentication card 110 is implemented as, for example, a smart card, or a USB security token etc. In FIG. 6, the biometric authentication card 110 implemented as the smart card is prefiguratively illustrated, and the biometric authentication card 110 may comprises a biometric device 610, an one-time password (OTP) displayer 620, and an IC chip 630 etc., the registered biometric information and various information etc. can be stored in the biometric device 610 and the IC chip 630 or an inner storing place of the card, etc. to compare the public key certificate information with the authenticated biometric information.

Also, the OTP and/or public key certificate can be used to reserve using Internet the vehicle such as a renter car etc. through the driver authorization by the vehicle occupants such as the driver, the passenger, etc. In the preferred embodiment, the public key certificate is a kind of electromagnetic warranty, is issued by the certain authorized organization, and the contents of the public key certificate compares owner name, expiration date, public key for authorizing a digital signature of the owner, and a digital signature value of the public key certificate authority for authorizing that the above contents are truth.

According to the preferred embodiment of the present invention as described above, only the authorized driver can get on the vehicle by controlling opening or closing of the vehicle door in accordance with the biometric information authentication result through the biometric authentication card 110, and the present invention can obtain the effects that the vehicle stolen is prohibited beforehand.

In the FIG. 5 of the preferred embodiment, the biometric authentication card 110 and the terminal 510 is constituted independently, but not limiting to this configuration, while the biometric authentication card 110 and the terminal 510 can be combined each other to be implemented with an all-in-one type.

According to the preferred embodiment of the present invention, the authorized driver, authorized the driver authorization, can start up or drive the vehicle by controlling the permit limited operation in accordance with the driver authorization result, since the vehicle terminal 120 executes the driver authorization by using the biometric authentication card 110 that the driver possesses, thereby preventing the vehicle stolen beforehand.

According to the preferred embodiment of the present invention, it can obtained the effect that the vehicle theft is no longer be progressed by controlling disallow the vehicle 100 to run, when the corresponding vehicle 100 has moved exceeding the predetermined distance after the driver authorization failure. It can obtained the effect that the vehicle stolen can be prohibited beforehand, and promptly inform the vehicle stolen information by transmitting the auto vehicle theft alarm message, in case that the driver authorization is unsuccessful or the corresponding vehicle 100 has moved exceeding the predetermined distance after failing the driver authorization.

According to the preferred embodiment of the present invention, it can obtained the effect that the vehicle management can be conveniently and correctly managed after tracking the moving vehicle, or can monitor the vehicle theft status, by transmitting the certain information for tracking the vehicle 100 based on real time, in case the corresponding vehicle has moved after the driver authorization is successful.

According to the preferred embodiment of the present invention, it can obtained the effect that of protecting the driver get into the business vehicle and the passenger by authorizing the driver identity through the driver authorization, when the vehicle 100 is the business vehicle such as tax or bus, etc.

According to a preferred embodiment of the present invention, it can obtained the effect that only the authorized driver can charge the fare to the passenger by executing the transportation fares payment module after authorizing the driver authorization, when the vehicle 100 is the business vehicle such as the tax or bus, etc.

According to the preferred embodiment of the present invention, it can obtained the effect that the driver identity can authorize and use the protecting and tracking function for the vehicle occupants including the driver and the passengers, since the driver identity can be authorized and the vehicle also can be tracked by notifying the chauffeur service information when the person use the chauffeur service.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers.

In addition, terms like 'include', 'comprise', and 'have' should be interpreted in default as inclusive or open rather than exclusive or closed unless expressly defined to the contrary. All the terms that are technical, scientific or on the other hand agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

The invention claimed is:

1. A method for a driver authorization by using a biometric authentication card and an in-vehicle terminal, the method comprising performing a primary authentication in the biometric authentication card and performing a secondary authentication in the in-vehicle terminal, wherein the primary authentication includes:

storing, in the biometric authentication card, first vehicle assignment information, a public key infrastructure (PKI) certificate and a registered driver's biometric information encrypted based on the PKI certificate, wherein the PKI certificate contains encoded information that is obtained as a result of encoding the registered driver's biometric information;

acquiring a biometric pattern from a user;

comparing a user's biometric pattern with both the registered driver's biometric information stored in the biometric authentication card and the encoded information contained in the PKI certificate;

transmitting a tunneling start signal to the in-vehicle terminal for establishing a communication tunnel if the user's biometric pattern matches the registered driver's biometric information and the encoded information; and transmitting card information including the first vehicle assignment information and the encoded information contained in the PKI certificate to the in-vehicle terminal through the communication tunnel for the secondary authentication.

2. The method according to claim 1, the method further includes: controlling a locking state of vehicle doors depending on the results of the primary authentication.

3. The method according to claim 1, wherein the in-vehicle terminal is a mobile terminal.

4. The method according to claim 1, wherein the card information further includes unique identification information designated to the biometric authentication card.

5. The method according to claim 1, wherein the card information further includes a one-time password (OTP) generated in biometric authentication card.

6. The method according to claim 1, the method further includes:

generating a real-time location data of the vehicle by using the in-vehicle terminal if the card information received from the biometric authentication card is associated with a chauffeur; and transmitting an identity of the chauffeur and the real-time location data to the vehicle assignment server by using the in-vehicle terminal.

7. The method according to claim 1, wherein the secondary authentication includes:

receiving second vehicle assignment information from a vehicle assignment server; and comparing the first vehicle assignment information with the second vehicle assignment information and verifying the encoded information.

8. The method according to claim 7, further including transmitting a result of the secondary authentication to the vehicle assignment server.

9. The method according to claim 7, the method further includes: permitting a limited driving operation if the secondary authentication succeeds.

10. The method according to claim 9, the method further includes: generating a real-time location data of the vehicle by using the in-vehicle terminal; and transmitting the real-time location data to the vehicle assignment server by using the in-vehicle terminal.

11. The method according to claim 9, the method further includes: transmitting a warning message to the vehicle assignment server if the vehicle is moved in excess of a predetermined distance in the state that the secondary authentication fails.

12. The method according to claim 9, the method further includes: limiting the start of the vehicle if the secondary authentication fails.

13. The method according to claim 1, wherein the registered driver's biometric information includes at least two biometric patterns, one for an intended authentication of the registered driver and another for an unintended or forced authentication of the registered driver.

14. The method according to claim 13, wherein the tunneling start signal includes a uniform resource locator (URL) for which the in-vehicle terminal establishes the communication tunnel.

15. The method according to claim 14, wherein the tunneling start signal includes a URL of a vehicle assignment server if the user's biometric pattern matches said one for an intended authentication; and wherein the tunneling start signal includes a URL of a security managing server if the user's biometric pattern matches said another for an unintended or forced authentication.

16. A biometric authentication card for a driver authorization, comprising:
   means for storing first vehicle assignment information, a public key infrastructure (PKI) certificate, and a registered driver's biometric information encrypted based on the PKI certificate, wherein the PKI certificate contains encoded information that is obtained as a result of encoding the registered driver's biometric information;
   means for performing a primary authentication by comparing a user's biometric pattern with both the registered driver's biometric information and the encoded information;
   means for transmitting a tunneling start signal to an in-vehicle terminal for establishing a communication tunnel if the user's biometric pattern matches both the registered driver's biometric information and the encoded information; and
   means for transmitting card information through the communication tunnel, the card information being used in a secondary authentication performed by the in-vehicle terminal, wherein the card information includes the first vehicle assignment information and the encoded information contained in the PKI certificate.

17. The biometric authentication card according to claim 16, further comprising means for generating a one-time password (OTP), wherein the card information further includes the OTP.

18. The biometric authentication card according to claim 16, further comprising means for inputting the user's biometric pattern.

19. The biometric authentication card according to claim 16, wherein the biometric authentication card is a smart key constituted by a dongle or a USB token.

20. The biometric authentication card according to claim 16, wherein the registered driver's biometric information includes a plurality of biometric patterns respectively assigned to different URLs, each URL being a destination of the communication tunnel.

21. The biometric authentication card according to claim 16, wherein the card information further includes unique identification information designated to the biometric authentication card.

22. The biometric authentication card according to claim 16, wherein the registered driver's biometric information includes at least two biometric patterns, one for an intended authentication of the registered driver and another for an unintended or forced authentication of the registered driver.

23. The biometric authentication card according to claim 22, wherein the tunneling start signal includes a uniform resource locator (URL) to which the in-vehicle terminal establishes the communication tunnel.

24. The biometric authentication card according to claim 23,
   wherein the tunneling start signal includes a URL of a vehicle assignment server if the user's biometric pattern matches said one for an intended authentication; and
   wherein the tunneling start signal includes a URL of a security managing server if the user's biometric pattern matches said another for an unintended or forced authentication.

25. The biometric authentication card according to claim 16, wherein the in-vehicle terminal is a mobile terminal.

26. The biometric authentication card according to claim 15, wherein the in-vehicle terminal is included with the biometric authentication card.

* * * * *